United States Patent
Koike et al.

(10) Patent No.: US 6,583,606 B2
(45) Date of Patent: Jun. 24, 2003

(54) METHOD FOR CHARGING DETERMINING LIFE OF AND DETECTING STATE OF CHARGE OF BATTERY

(75) Inventors: Kiichi Koike, Kanagawa (JP); Nobuyuki Takami, Aichi (JP); Yasuyuki Yoshihara, Aichi (JP); Hiroyuki Jimbo, Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/867,279

(22) Filed: May 29, 2001

(65) Prior Publication Data

US 2002/0014879 A1 Feb. 7, 2002

(30) Foreign Application Priority Data

| May 29, 2000 | (JP) | ................................. | 2000-159248 |
| Jun. 5, 2000 | (JP) | ................................. | 2000-168306 |
| Jun. 5, 2000 | (JP) | ................................. | 2000-168307 |

(51) Int. Cl.$^7$ .............................................. H01M 10/44
(52) U.S. Cl. ....................................................... 320/149
(58) Field of Search ................................ 320/132, 137, 320/149; 324/426, 431, 433; 340/635, 636; 429/61, 90

(56) References Cited

U.S. PATENT DOCUMENTS

| 4,302,714 A | 11/1981 | Yefsky |
| 4,876,513 A | 10/1989 | Brilmyer et al. |
| 5,598,088 A | 1/1997 | Richter |
| 5,650,712 A | * 7/1997 | Kawai et al. |
| 5,793,188 A | 8/1998 | Cimbal et al. |
| 5,796,239 A | 8/1998 | van Phuoc et al. |
| 5,808,445 A | 9/1998 | Aylor et al. |
| 6,011,380 A | 1/2000 | Paryani et al. |

FOREIGN PATENT DOCUMENTS

| DE | 197 05 657 | 8/1998 |
| EP | 0 560 468 | 9/1993 |
| EP | 0 840 135 | 5/1998 |
| FR | 2 722 336 A | 1/1996 |
| WO | WO 89 01169 | 2/1989 |
| WO | WO 00 19578 | 4/2000 |

OTHER PUBLICATIONS

Copy of European Search Report dated Sep. 19, 2002.

Copy of European Search Report dated Dec. 19, 2002.

\* cited by examiner

*Primary Examiner*—Edward H. Tso
(74) *Attorney, Agent, or Firm*—Snell & Wilmer, LLP

(57) ABSTRACT

A method for charging a lead battery is provided. In the method, a SOC is controlled so as to be less than 100%, and when the lead battery has not been charged and discharged for a predetermined time, refresh charge is performed so that the SOC becomes at least 90% or more.

15 Claims, 16 Drawing Sheets

FIG. 7 Stability of OCV(SOC) after charge and discharge

[Life determination based on SOC value calculated from integrated current and OCV]

Battery: 12V, 30Ah/5HR
(lead battery)

METHOD FOR CHARGING DETERMINING LIFE OF AND DETECTING STATE OF CHARGE OF BATTERY

BACKGROUND OF THE INVENTION

1. Field of the Invention

The present invention relates to a method for charging a battery, and more particularly to a charging method suited for a lead battery carried aboard a vehicle and used for the purpose of starting an engine, turning on a lamp, operating an air conditioner, and the like.

The present invention also relates to a method for determining the life of a battery, and more particularly to a life determination method suited for an on-board lead battery used for the purpose of starting an engine, turning on a lamp, operating an air conditioner, and the like.

The present invention also relates to a method for detecting the state of charge of a lead battery and a method for determining the degradation of a lead battery using the detection method, and more particularly to a state-of-charge detection method and a degradation determination method using the detection method, suited for an on-board lead battery used for the purpose of starting an engine, turning on a lamp, operating an air conditioner, and the like.

2. Description of the Related Art

Batteries such as a lead battery carried aboard a vehicle are used for the purpose of starting an engine, turning on a lamp, and the like. In driving, the batteries are subjected to constant-voltage charge with a predetermined voltage so that the batteries are charged to about 100% or more of full charge. The state of charge of the batteries are hereinafter referred to as SOC. The term "SOC" may also refer to a charging rate.

Recently, in order to improve the fuel efficiency of vehicles, a system for charging regenerative power in deceleration into a battery, and such a system further operating an air conditioner or the like, which is conventionally energized by the driving force of an engine, using a lead battery, have been proposed.

In order to perform such regenerative charge, a battery needs to be in a SOC in which the battery is kept partially charged, i.e., less than 100% of full charge.

In a lead battery, when charge and discharge are performed at a low level of SOC, degradation is likely to proceed. The degradation is particularly significant when the SOC is low, specifically when charge and discharge are continuously repeated where the SOC is about 50% or less. In this case, at a positive pole, the sulfuric acid concentration of an electrolyte solution is about 15% or less so that the corrosion rate of a positive pole grid made of lead alloy is rapidly increased while, at a negative pole, coarse lead sulfate is produced as a result of discharge so that the discharge capacity of the lead battery is dramatically reduced.

Therefore, when a lead battery is charged and discharged at a low level of SOC, the level of a SOC needs to be about 50% or more. Further, refresh charge needs to be performed at a certain frequency or more so that the SOC is about 100%.

The SOC of a lead battery is typically evaluated based on an open circuit voltage (OCV) of the lead battery. The SOC and OCV of the lead battery has substantially a constant relationship. When the SOC is decreased, the OCV is linearly decreased. When it is detected that the SOC is a predetermined value or less, the lead battery is subjected to refresh charge. Alternatively, the lead battery is subjected to refresh charge at predetermined time intervals.

The degradation of a lead battery due to a reduction in a SOC is involved with the sulfuric acid concentration of an electrolyte solution. Specifically, when a SOC is about 50% or less, the sulfuric acid concentration of an electrolyte solution is about 16% or less. In such a situation, when charge and discharge are performed, the corrosion rate of a positive pole grid made of lead alloy is rapidly increased. This may be responsible for the degradation of the lead battery.

Therefore, a SOC needs to be measured with precision during charging.

As described above, the SOC and OCV of a lead battery has substantially a constant relationship. When the SOC is decreased, the OCV is linearly decreased. By detecting the SOC in accordance with such a relationship, the lead battery can be controlled so that the SOC falls within an appropriate range.

Lead batteries for use in vehicles have been found to be degraded when regenerative charge and discharge are repeated using a large current density when the SOC is low. Such a degradation in performance is not found in alkaline batteries such as a nickel-hydrogen battery, lithium ion secondary batteries, or the like, but is specific to lead batteries. Due to the performance degradation, the lead batteries are unlikely to provide stable use over a long time.

Further, when a lead battery is used at a low temperature of 0° C. or less, the viscosity of the electrolyte solution is rapidly increased. This leads to a reduction in a battery reaction rate, resulting in rapid decreases in a discharge capacity and an output voltage.

Furthermore, when a SOC is about 50% or less, the sulfuric acid concentration of an electrolyte solution is lowered. The corrosion rate of a positive pole grid made of lead alloy is rapidly increased. This leads to a reduction in the life of a lead battery.

When an on-board lead battery is degraded due to use, even if the battery is refresh-charged toward a SOC of 100%, the SOC is not increased up to 100%, i.e., the performance of the lead battery is decreased. If such a degraded lead battery, in which even though the battery is refresh-charged toward a SOC of 100%, the SOC is not increased up to 100%, is further used, the lead battery will soon be dead, i.e., cannot be used. Since by how much the lead battery is degraded cannot be clearly detected, the lead battery may unexpectedly die.

When an on-board lead battery is degraded due to use, the SOC cannot be increased even if the OCV is increased. If the water content of an electrolyte solution is decreased due to overcharge or evaporation, the sulfuric acid concentration of the electrolyte solution is increased. Since the OCV is determined by the sulfuric acid concentration, the OCV is consequently increased. When the degradation further proceeds, coarse lead sulfate is produced as a result of discharge and accumulated at an active material of positive and negative poles. This hinders the SOC from being recovered even when the lead battery is recharged. In this case, the sulfuric acid concentration is decreased, so that the OCV-SOC relationship is deviated from a predetermined condition. In such a case, even though the SOC is evaluated based on the predetermined OCV-SOC relationship, the exact SOC is unlikely to be obtained. This makes it impossible to control charge with high precision so that the lead battery is in a predetermined SOC. Such a problem arises significantly in a lead battery in which sulfuric acid which is a solute in an electrolyte solution acts as a battery active material.

SUMMARY OF THE INVENTION

According to one aspect of the present invention, a method for charging a lead battery is provided, in which a SOC is controlled so as to be less than 100%, and when the lead battery has not been charged and discharged for a predetermined time, refresh charge is performed so that the SOC becomes at least 90% or more.

According to another aspect of the present invention, a method for charging a lead battery is provided, in which a SOC is controlled so as to be less than 100%, and every time the lead battery is charged and discharged in predetermined time intervals, refresh charge is performed so that the SOC becomes at least 90% or more.

According to one aspect of the present invention, a method for charging a lead battery is provided, in which a SOC is controlled so as to be less than 100%, and when the SOC is lowered below a predetermined value, refresh charge is performed so that the SOC becomes at least 90% or more.

According to another aspect of the present invention, a method for charging a lead battery is provided, in which a SOC is controlled so as to be less than 100%, and when a temperature of the lead battery is less than or equal to a predetermined value, refresh charge is performed so that the SOC becomes at least 90% or more.

In one embodiment of this invention, in the refresh charge, after a charging current is lowered to a predetermined value even though the lead battery is subjected to constant-voltage charge using a predetermined control voltage, constant-current charge is performed, or constant-voltage charge is performed using a control voltage higher the predetermined control voltage.

In one embodiment of this invention, a set value of the SOC, after the refresh charge, is increased with an increase in a cycle of the refresh charge.

In one embodiment of this invention, the SOC is calculated based on an OCV of the lead battery immediately before the start of charge and discharge of the lead battery.

In one embodiment of this invention, the SOC is calculated based on an OCV of the lead battery when charge and discharge are paused, or based on a discharging current and a discharging voltage.

According to another aspect of the present invention, a method for determining the life of a battery is provided, in which the battery is subjected to refresh charge, a SOC of the battery after the refresh charge is presumed to be 100%, charge and discharge are performed, and a SOC(1) of the battery after the charge and discharge, the SOC(1) being obtained based on a quantity of charged, and a SOC(2) obtained based on a discharging voltage in discharge are compared with each other, and the life of the battery is determined based on a difference between the SOC (1) and the SOC(2).

According to another aspect of the present invention, a method for determining the life of a battery is provided, in which a first DC-IR value is obtained with respect to a SOC of the battery in an initial state where the battery is not degraded, based on charging and discharging currents and a battery voltage, and the first DC-IR value is compared with a second DC-IR value of the battery in the initial state obtained in advance, and the life of the battery is determined based on a difference between the first and second DC-IR values.

According to another aspect of the present invention, a method for detecting a SOC of a lead battery is provided, in which an OCV of the lead battery or a discharging voltage of the lead battery when a discharging current is less than or equal to a predetermined value is measured, and the SOC of the lead battery is detected based on a relationship between a predetermined OCV and the SOC or a relationship between the discharging voltage and the SOC, and when the SOC is calculated, a variation in the OCV or a variation in the discharging voltage and a variation in the SOC are measured with respect to a predetermined time, and the relationship between the predetermined OCV and the SOC or the relationship between the discharging voltage and the SOC is corrected.

In one embodiment of this invention, the variation in the SOC is obtained based on a quantity of charged and discharged electricity obtained by integrating charging and discharging currents in the predetermined time.

According to another aspect of the present invention, a method for determining degradation of a lead battery using the method for detecting a SOC of a lead battery of this invention is provided, in which the degradation of the lead battery is determined based on a corrected relationship between an OCV of the lead battery and the SOC or a corrected relationship between a discharging voltage and the SOC.

In one embodiment of this invention, a ratio of a variation in the OCV or a variation in the discharging voltage to a variation in the SOC is calculated, and the degradation of the lead battery is determined based on the ratio.

In one embodiment of this invention, a value (K) is calculated by dividing the variation in the OCV or the variation in the discharging voltage by the variation in the SOC, and when the value (K) is greater than or equal to a predetermined value, it is determined that the lead battery is degraded.

Thus, the invention described herein makes possible the advantages of providing: (1) a method for charging a lead battery in which a reduction in the performance of the lead battery is suppressed so that the lead battery can be stably used for a long time; (2) a method for determining the life of a battery in which the life of the battery can be exactly determined so that the sudden death of the battery can be avoided; (3) a method for accurately detecting the SOC in order to charge a lead battery with precision so that the SOC becomes a predetermined value; and (4) a method for determining the condition of a degraded lead battery based on the OCV of the lead battery or a relationship between a discharging voltage and the SOC.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
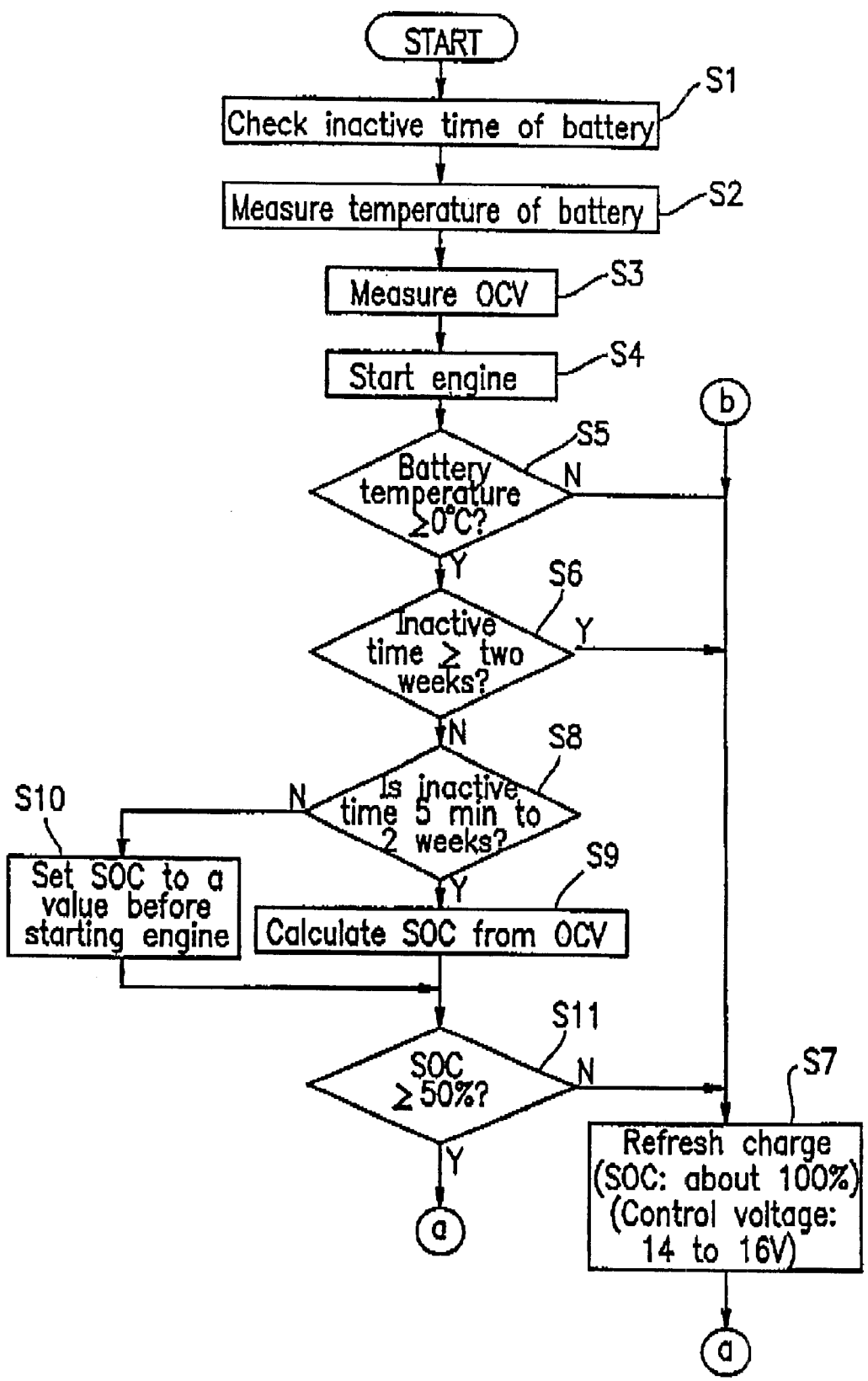
FIG. 1 is a flowchart showing an exemplary method for charging a lead battery of the present invention.
Figure 2:
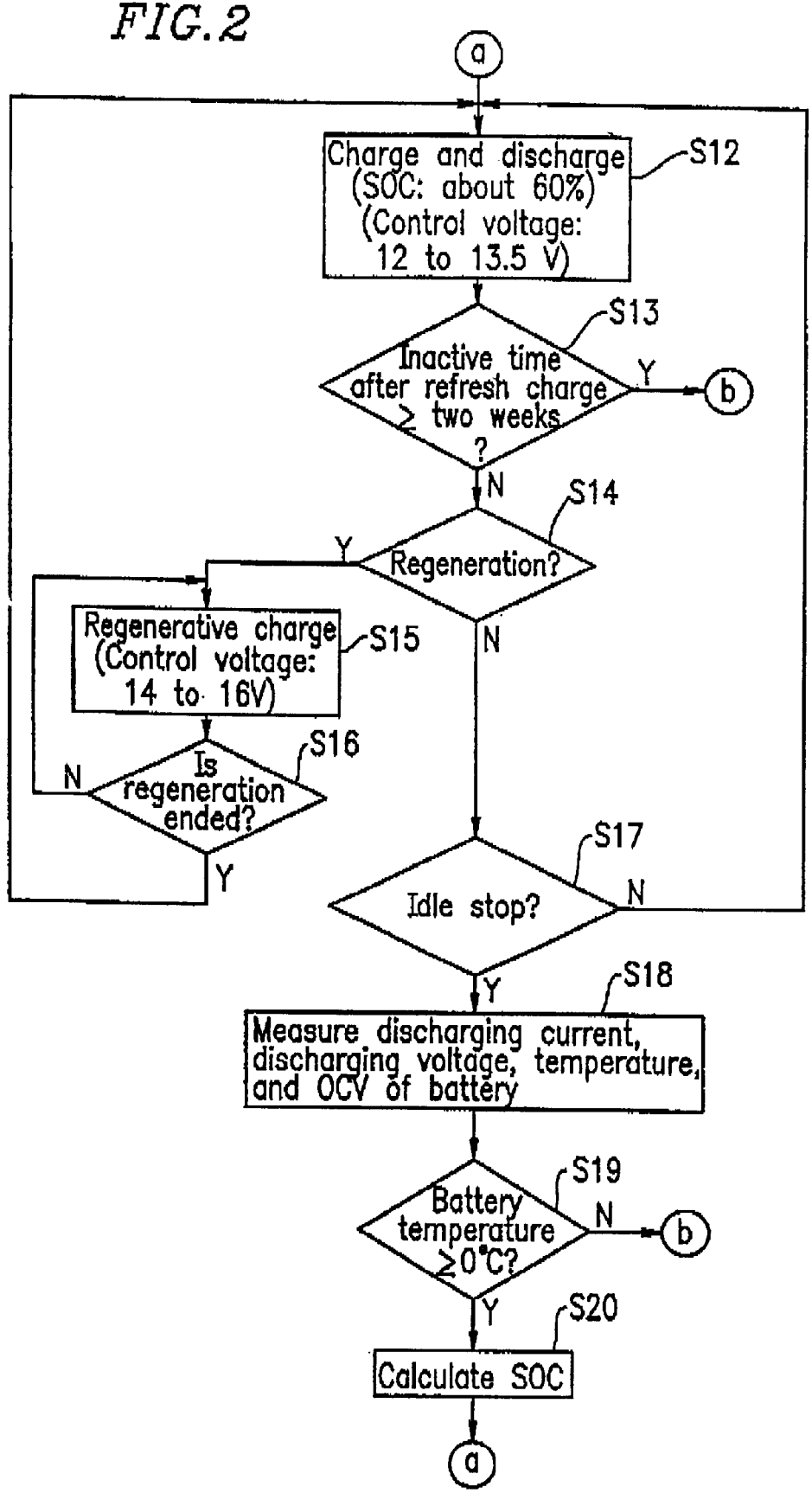
FIG. 2 is a flowchart showing an exemplary method for charging a lead battery of the present invention.

FIGS. 1 and 2 are flowcharts showing an exemplary method for charging a lead battery of the present invention. In accordance with the method of the flowcharts, the SOC of a lead battery for vehicles is kept at about 100% due to regenerative charge in driving.

The method for charging a lead battery of the present invention is initiated by switching ON an ignition switch in a vehicle. First of all, a period of time in which the lead battery is left uncharged and undischarged is checked in the course of charge and discharge operations (step S1 in FIG. 1). Such a time period is hereinafter referred to as an "inactive time", and such a check operation is hereinafter referred to as an "elapsed-time check". Specifically, a period of time, which is measured by a timer after the engine of a vehicle is stopped until the ignition switch is turned ON, is checked. Thereafter, the temperature and the OCV of the lead battery are measured (steps S2 and S3).

Thereafter, when the engine of the vehicle is started (step S4), it is determined whether the temperature of the lead battery measured in step S2 is greater than or equal to about 0° C. (step S5). When the temperature of lead battery is less than about 0° C., a charge control voltage is set to a high voltage of about 14 V to 16 V in order to cause the SOC to be about 100% (full charge), i.e., refresh charge is performed (step S7).

When the temperature of the lead battery is greater than or equal to about 0° C., the inactive time obtained by the elapsed-time check in step S1 is reviewed (step S6). When the inactive time was two weeks or more, the SOC (charging rate) of the lead battery is presumed to be low. Then, the charge control voltage is set to a high voltage of about 14 V to 16 V in order to cause the SOC to be about 100% (full charge), i.e., refresh charge is performed (step S7).

In the refresh charge, the eventual SOC may not necessarily become 100%, i.e., full charge. The eventual SOC may be about 90% or more.

Figure 3:
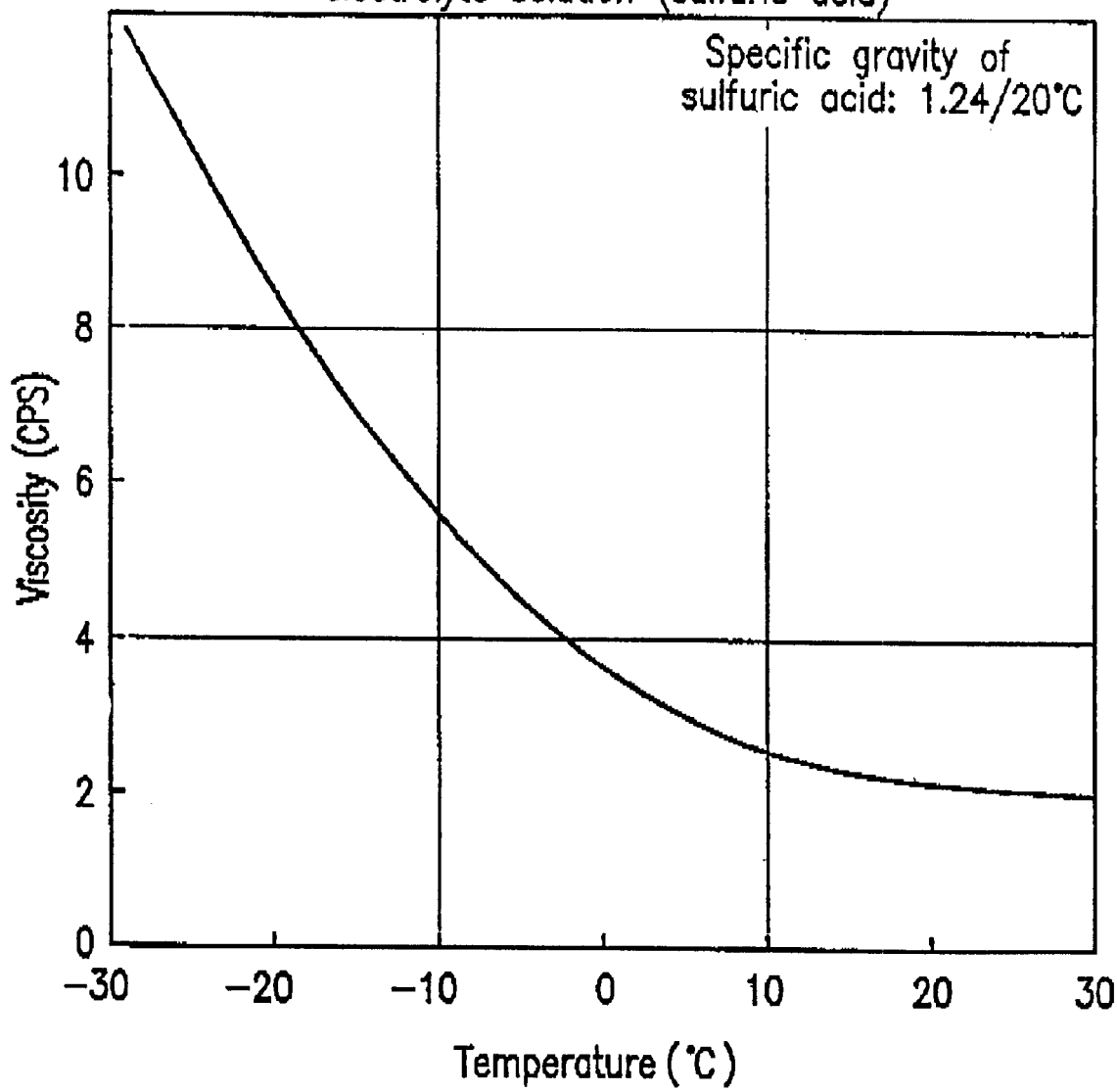
FIG. 3 is a graph showing a relationship between the temperature of a lead battery and the viscosity of an electrolyte solution or sulfuric acid.
Figure 4:
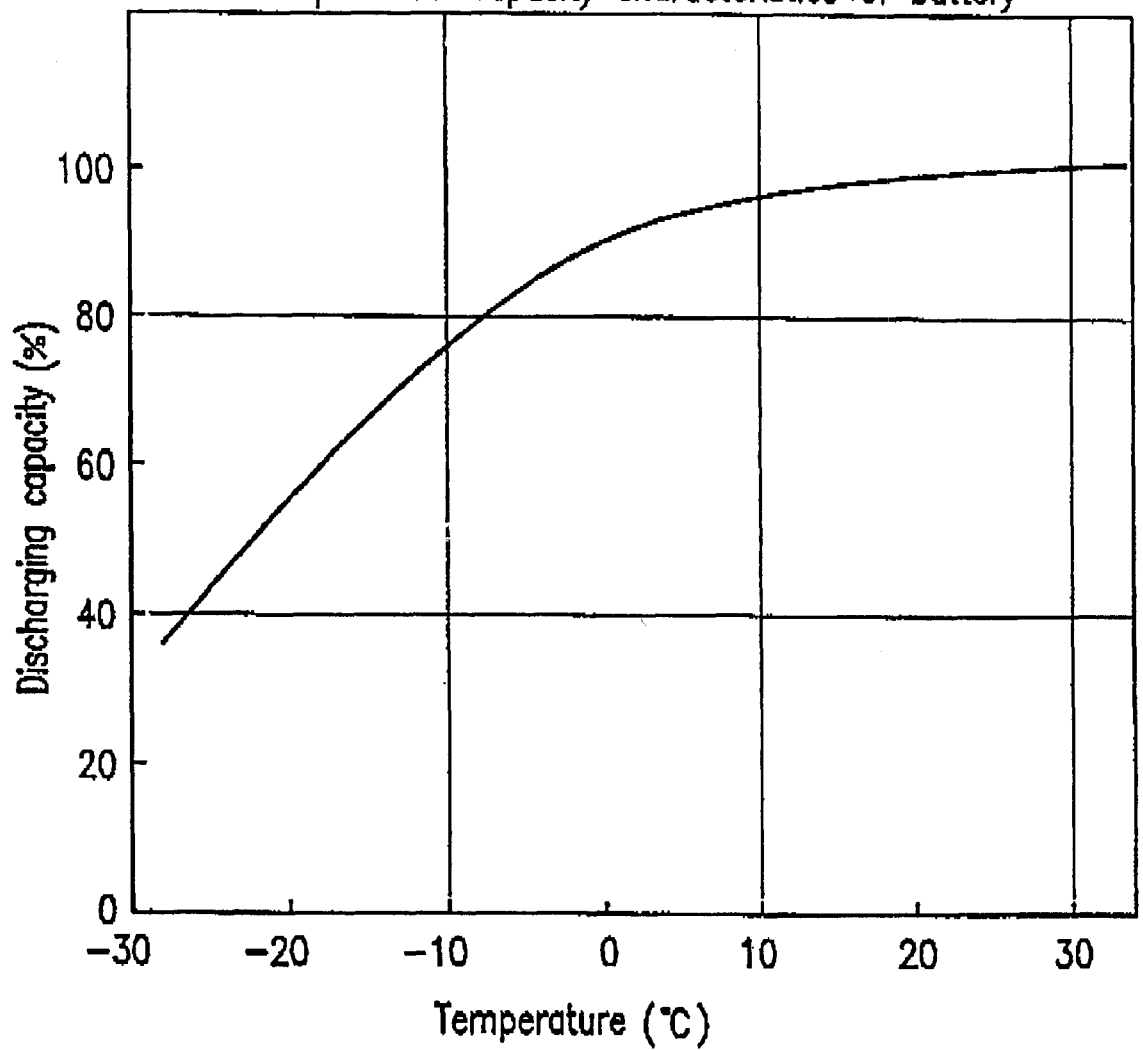
FIG. 4 is a graph showing a relationship between the temperature and the discharge capacity of a lead battery.

When the temperature of the lead battery is less than about 0° C., the viscosity of a dilute sulfuric acid as an electrolyte solution is rapidly increased as indicated by a graph in FIG. 3. This leads to a reduction in a battery reaction rate. Further, as shown in FIG. 4, the discharge capacity is rapidly decreased while the output voltage is rapidly lowered. In such a situation, therefore, the SOC needs to be increased in order to obtain a required level of output. When the temperature of the lead battery is in a low temperature range of less than about 0° C., regenerative charge would increase the charging voltage, so that water in the electrolyte solution is electrolyzed to generate oxygen gas and hydrogen gas. For this reason, the charge and discharge efficiency is lowered, and regenerative charge does not satisfactorily exert its effect. In the low temperature range (e.g., 0° C.), even if the SOC is low, the efficiency of regenerative charge is reduced. Therefore, it is meaningless for the SOC to be controlled so as to be low in the low temperature range. Further, it is likely that a required level of output is not obtained if the SOC is low. Therefore, in the low temperature range, the SOC is controlled so as to be high more preferably than so as to be low. Therefore, to avoid the problem that the charge and discharge efficiency is lowered, refresh charge is performed so that the SOC becomes about 100%.

When a lead battery was not charged or discharged in two weeks or more, refresh charge is required by the following reason.

In a lead battery, the following chemical reactions occur at a positive pole and a negative pole thereof when discharging. When charging, the progression of the reaction is reversed.

Positive pole: $PbO_2+H_2SO_4 \rightarrow PbSO_4+H_2O+1/2O_2$

Negative pole: $Pb+H_2SO_4+1/2O_2 \rightarrow PbSO_4+H_2O$

In this manner, $PbSO_4$ (lead sulfate) is generated at both positive and negative poles due to the discharge. When charging, $PbSO_4$ is restored to $PbO_2$ which is the active material of the positive pole or Pb which is the active material of the negative pole. Now, it is assumed that the SOC is set to a low value, and that regenerative charge or charge and discharge are repeated at a large current density. The charge and discharge reactions are concentrated around the grids, and on the surfaces, of the positive and negative pole plates. When charging, $PbSO_4$ fails to be restored to the active material, so that $PbSO_4$ remains and accumulates on the surfaces of the plates and the like. Such $PbSO_4$ is unevenly distributed on the plates. If the lead battery is left inactive for a long time, the $PbSO_4$ will have a large size of crystal structure. Such $PbSO_4$ is unlikely to be restored to $PbO_2$ or Pb (active materials) when charging.

In the example of the present invention, however, when the lead battery was not charged and discharged in two weeks or more, for example, refresh charge is performed so that the SOC is substantially fully charged. Therefore, the unevenly distributed $PbSO_4$ is restored to $PbO_2$ or Pb (active materials), so that the $PbSO_4$ can be prevented from growing into a large crystal structure. The prevention of the $PbSO_4$ crystal structure accumulation contributes to achievement of the long life of the lead battery.

When refresh charge which causes the SOC to be about 90% or more is frequently performed, the amount of time available for regenerative charge is reduced. Further, the number of times of deep discharge and charge of the lead battery is increased. This likely leads to degradation of the active material of the positive and negative poles. Therefore, refresh charge is preferably performed in short cycles such as once a week or once a month.

Figure 5:
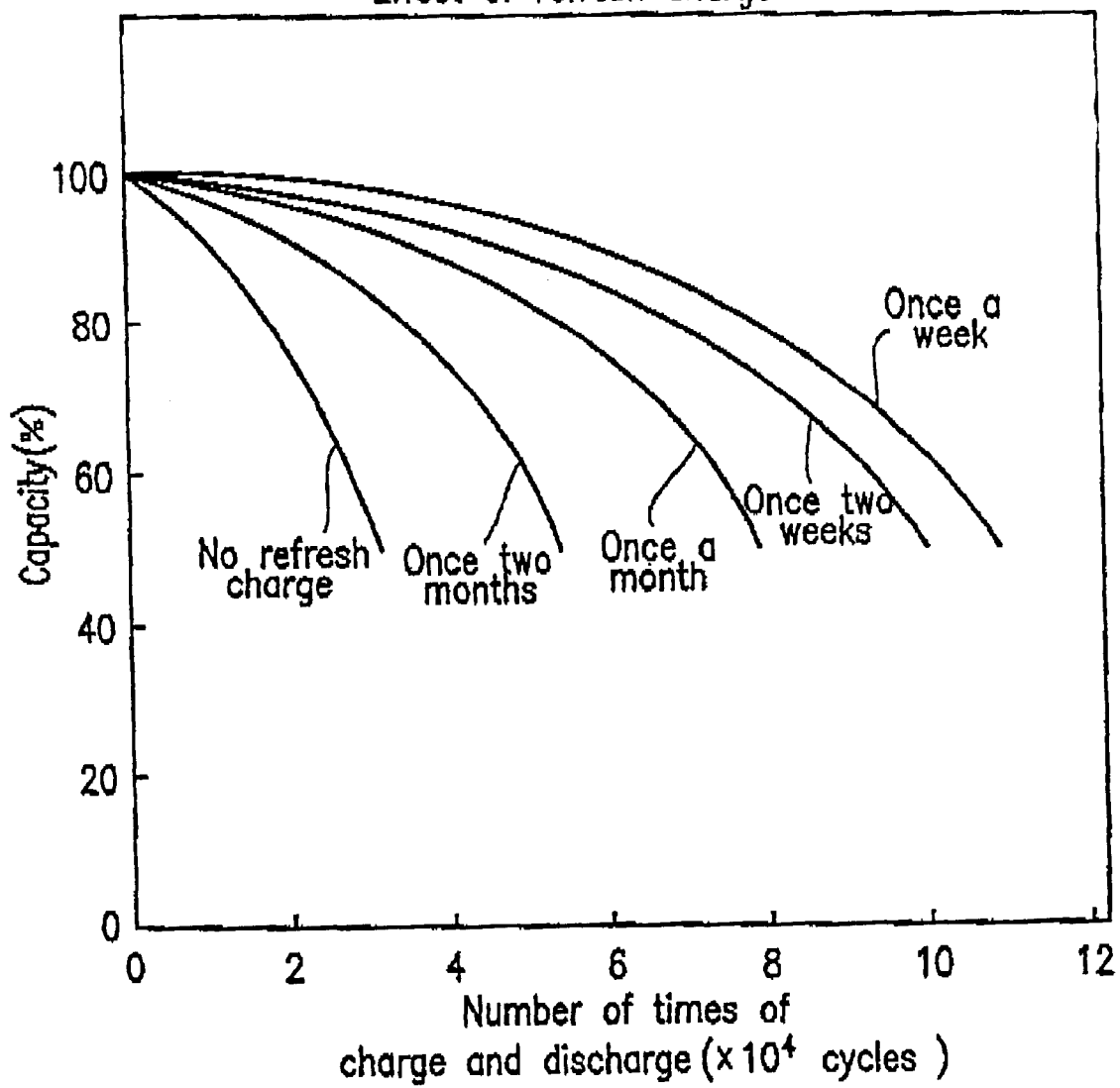
FIG. 5 is a graph of an experimental result, showing a relationship between the capacity of a lead battery and the frequency of charge and discharge when the cycle of refresh charge is varied.

FIG. 5 is a graph of an experimental result, showing a relationship between the capacity of a lead battery and the frequency of charge and discharge when the cycle of refresh charge is varied. In the experiment, the lead battery was a seal type battery having a voltage of 12 V and a capacity of 30 Ah/5 HR. The lead battery was charged and discharged at a temperature of 50° C. The charging condition was 60 A×15 sec while the discharging condition was 30 A×25 sec. Refresh charge was performed by constant-voltage charge of 15 V (maximum current was 60 A) for one hour.

As is apparent from the graph of FIG. 5, the shorter the cycle of refresh charge, the longer the life of the lead battery.

When the cycle of refresh charge is short, refresh charge may be performed where the upper limit of the SOC is set to about 90%, for example. When the cycle of refresh charge is long, refresh charge may be performed where the SOC reaches about 90% or more, for example. The short cycle of refresh charge can lead to prevention of degradation of the active materials, even if the lead battery is not charged up to the SOC of about 90% or more.

Refresh charge may be performed in the following manner. At an initial period, constant-voltage charge is performed. The voltage of the lead battery is thus increased to reach a predetermined value. In this case, a charging current is lowered to a predetermined value or less. Thereafter, constant current charge is performed for a predetermined time. Alternatively, after a voltage reaches the predetermined value, constant-voltage charge using a higher control voltage may be performed. Thereby, refresh charge can be completed in a shorter time.

Table 1 shows a time required for the SOC of a lead battery to be about 90% or more under the following conditions. The lead battery is a seal type battery having a voltage of 12 V and a capacity of 30 Ah/5 HR. For the lead battery, refresh charge is performed at a temperature of 40° C. In the refresh charge, constant-voltage charge using a charging voltage of 15 V (maximum current is 50 A) is performed and thereafter constant current charge using a charging current of 6 A is performed. In this case, the SOC of the lead battery before the refresh charge is 60%. For comparison, another time required for the SOC of a lead battery to be about 90% or more is also shown where refresh charge is performed only by constant-voltage charge using a charging voltage of 15 V (maximum current is 50 A). As is apparent from Table 1, a combination of constant-voltage charge and constant current charge can lead to a reduction in the time required for the SOC to be about 100%.

TABLE 1

| Method of Refresh charge (40° C.) | Time required for charge up to SOC 90% | Time required for charge up to SOC 95% | Time required for charge up to SOC 100% |
| --- | --- | --- | --- |
| 15 V constant voltage, Max 50 A + 6 A constant current | 11.5 min | 17.0 min | 29.0 min |
| 15 V constant voltage, Max 50 A | 11.5 min | 19.0 min | 65.0 min |

When the inactive time of the lead battery before starting an engine is five minutes or more and less than two weeks (step S8), the SOC is calculated based on the OCV measured in step S3 (step S9).

Figure 6:
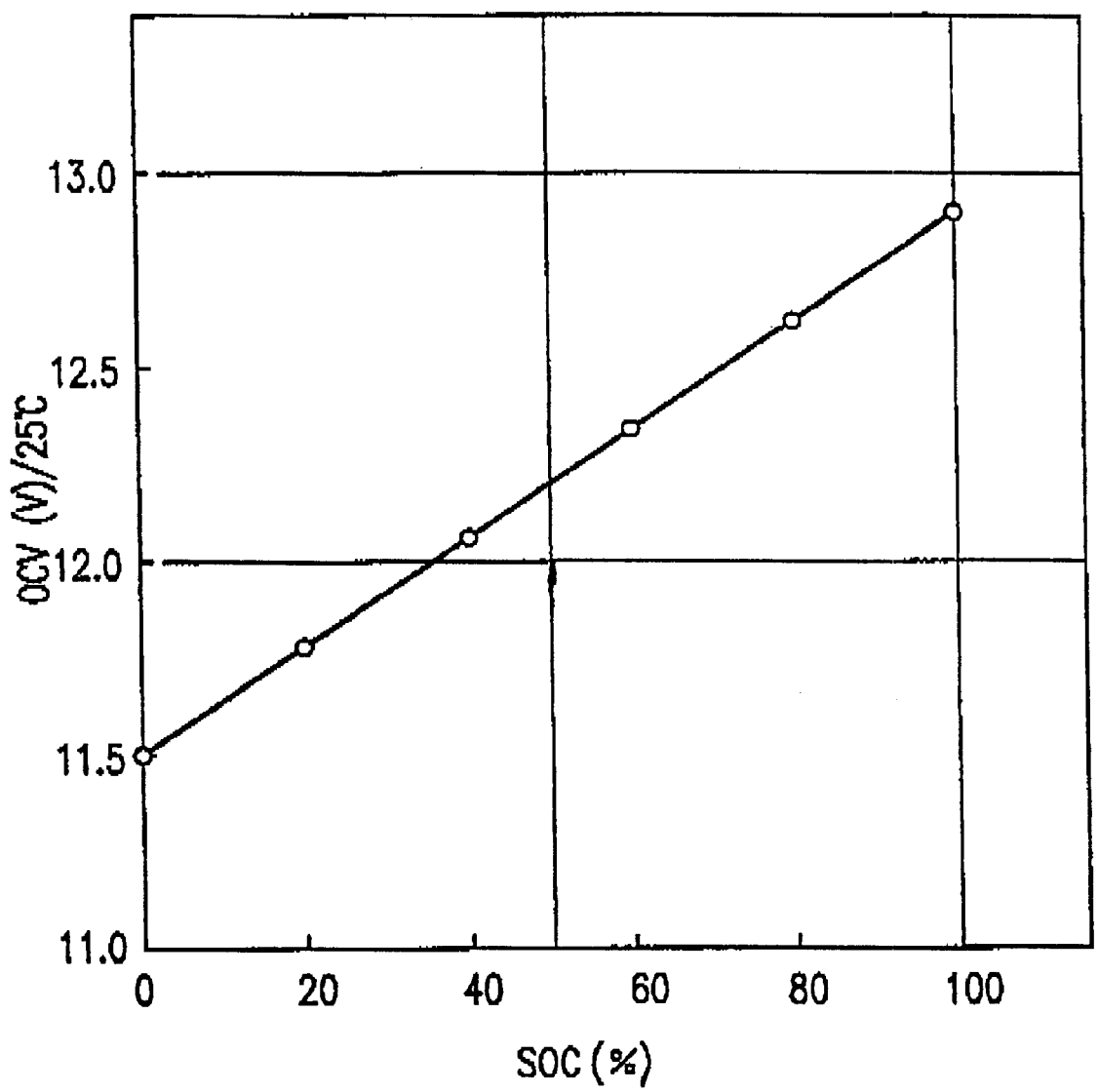
FIG. 6 is a graph showing SOC-OCV characteristics of a lead battery.

FIG. 6 is a graph showing SOC-OCV characteristics of a seal type lead battery having a voltage of 12 V and a capacity of 30 Ah/5 HR. As is apparent from the graph, SOC is substantially proportional to OCV. Therefore, in accordance with such a proportional relationship, the SOC of the lead battery can be calculated based on the measured OCV thereof.

When the inactive time of the lead battery before starting an engine is less than five minutes, the OCV is considered to be unstable. In this case, the SOC of the lead battery is assumed to be a value before starting the engine (step S10). The OCV of the lead battery is determined by the sulfuric acid concentration of the electrolyte solution in the lead battery. When the lead battery is being charged and discharged, a sulfuric acid concentration gradient is formed between the insides of positive and negative pole plates, and the surfaces thereof and separators adjacent to the surfaces. The OCV is unstable until the sulfuric acid concentration gradient is dispelled due to diffusion of sulfuric acid. Therefore, the stability of the OCV is determined by the diffusion rate of sulfuric acid in the electrolyte solution.

Figure 7:
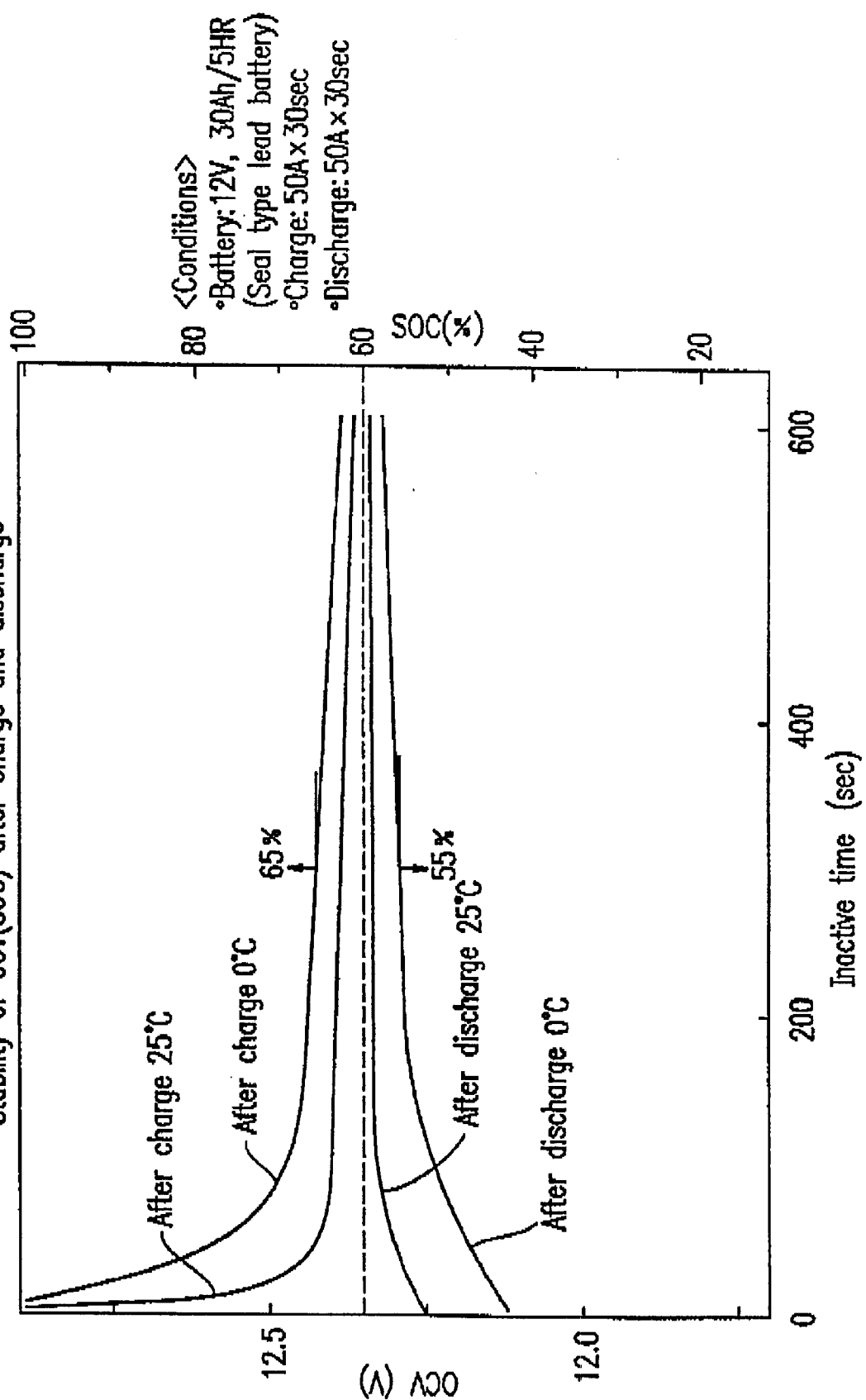
FIG. 7 is a graph showing a time required for the OCV of a lead battery to become stable after the battery is charged and discharged for 30 sec using a current of 50 A.

FIG. 7 is a graph showing a time required for the OCV of a lead battery to become stable after the battery is charged and discharged for 30 sec using a current of 50 A where the lead battery is a seal type battery having a voltage of 12 V and a capacity of 30 Ah/5 HR. The OCV normally becomes substantially stable after having been left uncharged and undischarged for about 200 sec. However, in a low temperature range of 0° C. or less, since the viscosity of an electrolyte solution is rapidly increased, it takes five minutes or more for the OCV to become stable. Therefore, when the inactive time of the lead battery before starting an engine is less than five minutes, the SOC of the lead battery before starting the engine is adopted without calculating the SOC based on the unstable OCV.

Whether the calculated SOC of the lead battery is 50% or more is determined (step S11). When the SOC is less than 50%, refresh charge is performed (step S7).

Figure 8:
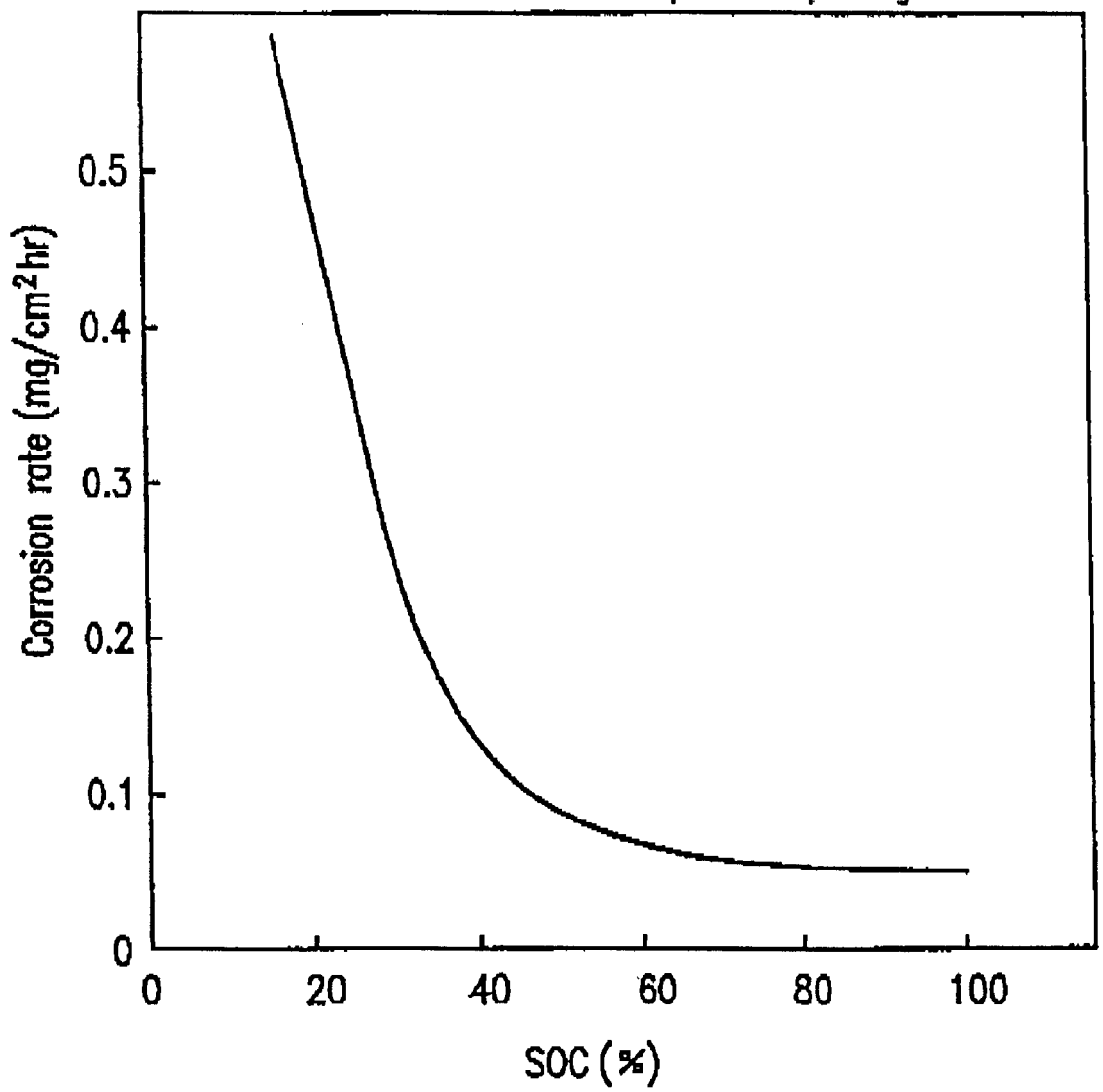
FIG. 8 is a graph showing a relationship between the SOC and the corrosion rate of a positive pole grid made of lead alloy.

When the SOC is less than 50%, the sulfuric acid concentration of the electrolyte solution is lowered. In such a low concentration range, the corrosion rate of a positive pole grid made of lead alloy is suddenly increased. FIG. 8 is a graph showing a relationship between the SOC and the corrosion rate of the positive pole grid made of lead alloy. When the SOC is decreased to less than 50%, the sulfuric acid concentration is about 15% or less. When the lead battery is charged and discharged in such a situation, the corrosion rate of the positive pole grid made of lead alloy is rapidly increased. The increased corrosion rate of the positive pole grid leads to a reduction in the life of the lead battery.

Therefore, when the SOC is less than 50%, refresh charge is performed so that the SOC becomes about 100%. This prevents the lead battery from being charged and discharged when the sulfuric acid concentration of an electrolyte solution is lowered. Thereby, the life of the lead battery is increased.

In contrast, when the SOC is 50% or more, the lead battery is charged and discharged in such a normal manner that a control voltage of about 12 V to 13.5 V is applied to the lead battery in order to cause the SOC to be about 60% (step S12).

Thereafter, whether two weeks or more have elapsed after refresh charge is determined (step S13). When two weeks or more have elapsed after refresh charge, refresh charge is newly performed (step S7). By performing refresh discharge in a cycle of about two weeks, the life of a lead battery is increased.

Further, when a regenerative current is generated in driving (step S14), regenerative charge is performed using a charge control voltage of about 14 V to 16 V (steps S15 and S16).

In a case where an engine is stopped (idle-stop state) while an electric system still works when a vehicle waits at a traffic light, for example, (step S17), a discharging current, a battery voltage (discharging voltage) in this discharge, and the temperature of a lead battery are checked. In the idle stop, if discharge is not performed, the OCV and the temperature of the lead battery are checked (step S18). When the battery temperature is less than 0° C., refresh charge is performed (step S7). When the battery temperature is 0° C. or more (step S19), the SOC is calculated based on the discharging current, the battery voltage, or the OCV (step S20). When the OCV is used to calculate the SOC, it is necessary to use the value of the OCV which becomes stable after the lead battery has been discharged for a predetermined time or more.

Figure 9:
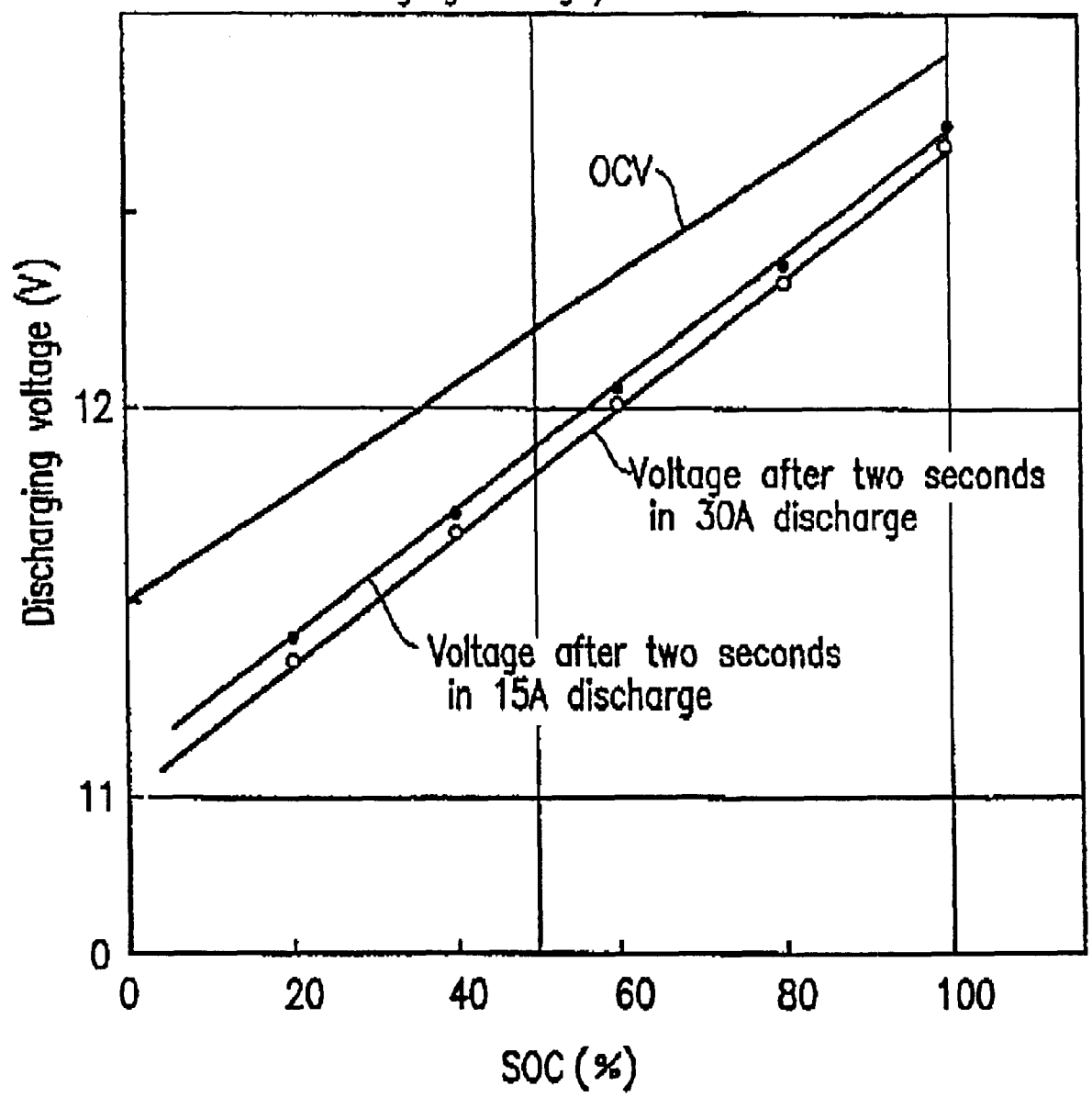
FIG. 9 is a graph showing an exemplary relationship between the SOC, and discharging current and voltage or the OCV.

FIG. 9 is a graph showing an exemplary relationship between a SOC, and a discharging current and a discharging voltage or an OCV. The SOC and the discharging current and voltage have a substantially constant relationship. The SOC and the OCV also have a substantially constant relationship. Therefore, the SOC can be determined based on the discharging current, the discharging voltage, or the OCV.

As described above, in the idle-stop state where the engine is stopped, the SOC is calculated. When the SOC is less than 50%, refresh charge is performed (step S20).

In the method for charging a lead battery according to the example of the present invention, the SOC is calculated based on the OCV before using the lead battery, and refresh charge is performed based on the SOC for the purpose of increasing the life of the lead battery. Therefore, the SOC of the lead battery can be determined with high precision. When the SOC is lowered to a predetermined value or less, refresh charge is performed, thereby preventing lead sulfate from being accumulated on the surfaces of pole plates. Therefore, the lead battery can be stably used for a long time. Further, when the lead battery is not charged and discharged for a predetermined time and when the temperature of the lead battery is lowered to a predetermined temperature or less, refresh charge is performed similarly, thereby increasing the life of the lead battery.

Further, by performing such refresh charge in cycles, lead sulfate is periodically removed from the surfaces of pole plates. This also contributes to an increase in the life of the lead battery.

Even in the idle-stop state where an engine is stopped, the SOC is accurately calculated. Therefore, it is possible to reliably determine, based on the SOC, whether refresh charge is required.

Figure 10:
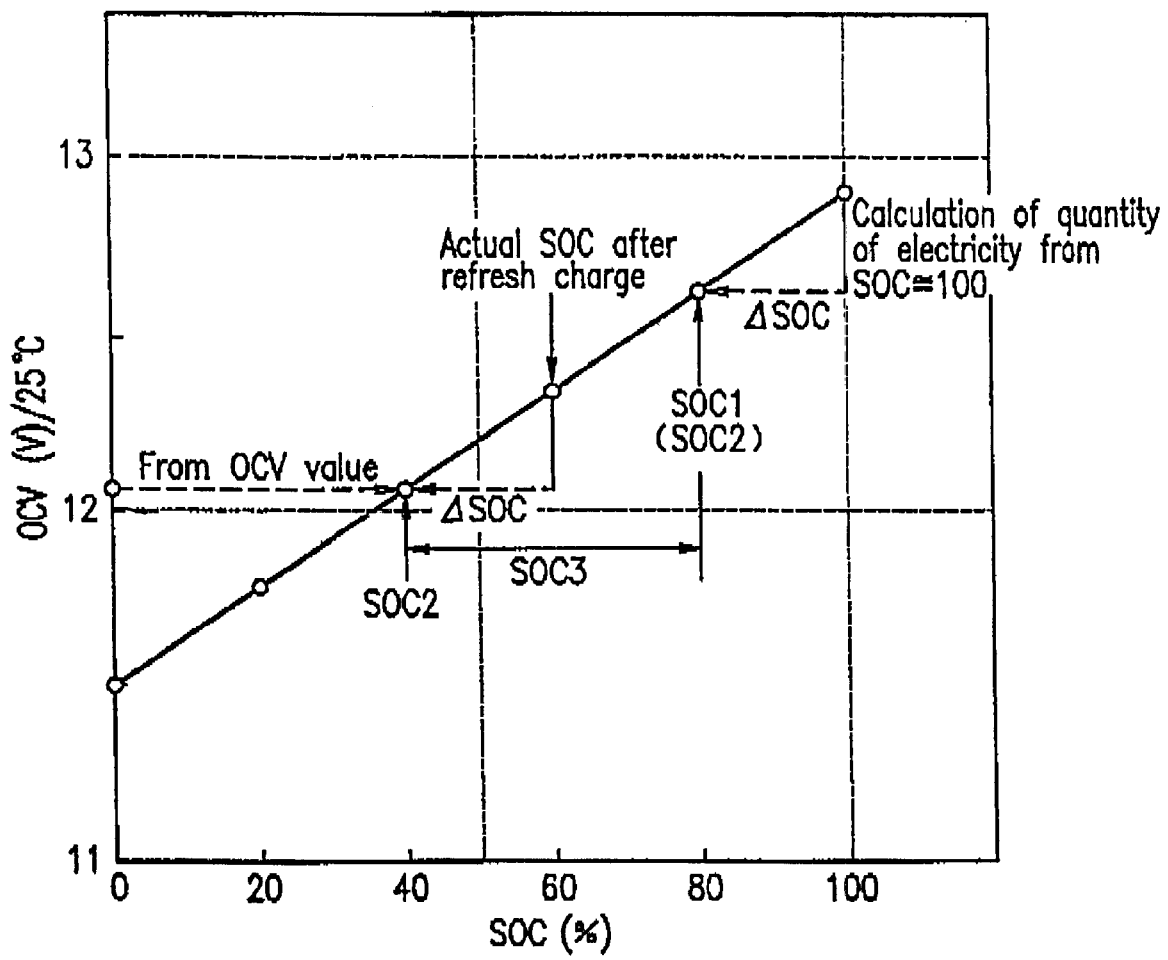
FIG. 10 is a graph showing SOC-OCV characteristics of a lead battery.

FIG. 10 is a graph showing SOC-OCV characteristics of a seal type lead battery having a voltage of 12 V and a capacity of 30 Ah/5 HR. As is apparent from FIG. 10, the SOC of the lead battery linearly increases with an increase in the OCV. In other words, the SOC is substantially proportional to the OCV.

In a method for determining the life of a battery according to the present invention, such a relationship between the OCV and the SOC is utilized.

Figure 11:
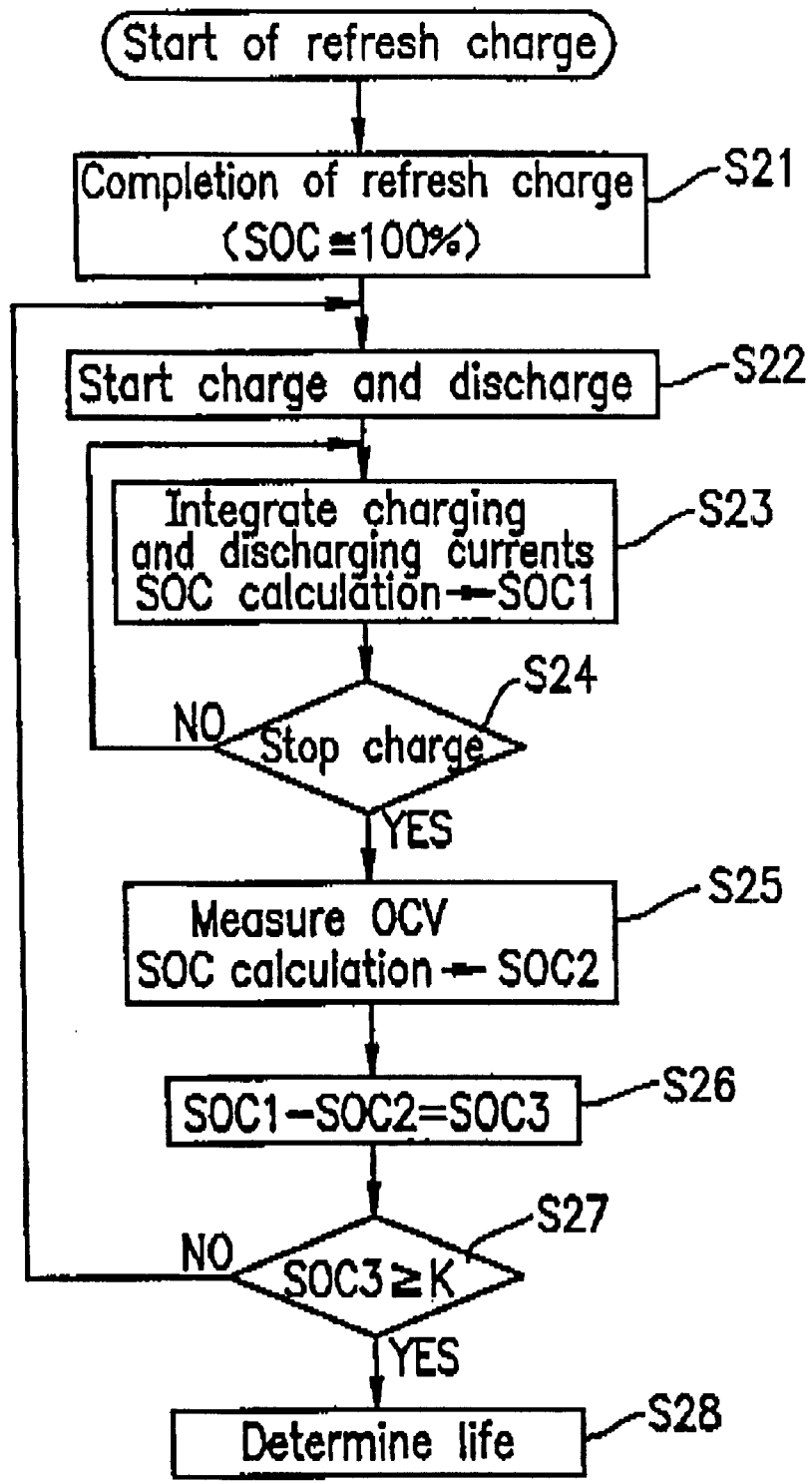
FIG. 11 is a flowchart showing an exemplary method for determining the life of a battery according to the present invention.

FIG. 11 is a flowchart showing an exemplary method for determining the life of a battery according to the present invention. The flowchart of FIG. 11 shows a life determination method for a lead battery carried on a vehicle. The life determination method is performed every time the lead battery is refresh-charged, for example.

Refresh charge is performed so that the SOC becomes about 100% (full charge). For example, for a 12-V lead battery, a charge control voltage is set to a high voltage, i.e., about 14 V to 16 V. Refresh charge is performed in predetermined time cycles and also when the SOC is less than 50% or more. The SOC of the lead battery is calculated based on the measured OCV thereof when an engine is stopped and the lead battery is not charged and discharged (e.g., an idle-stop state).

When the SOC of the lead battery is less than 50%, the sulfuric acid concentration of an electrolyte solution is lowered to about 15% or less. In this situation, when the lead battery is charged and discharged, the corrosion rate of a positive pole grid made of lead alloy is rapidly increased, thereby decreasing the life of the lead battery.

Therefore, when the SOC is less than 50%, refresh charge is performed in an attempt to cause the SOC to be about 100%. In this manner, the SOC is caused to be 50% or more, so that the lead battery is not charged and discharged when the sulfuric acid concentration of an electrolyte solution is lowered. Thereby, the life of the lead battery can be increased.

In the life determination method of the present invention, when completion of refresh charge is detected after refresh charge is initiated in an attempt to obtain a SOC of 100% (step S21 in FIG. 11), the lead battery begins to be charged and discharged (step S22). In this case, the quantities of charging and discharging currents are reset and then newly integrated by a current sensor to calculate the quantity of charged and discharged electricity (step S23).

Thereafter, for example, when an engine is stopped (idle-stop state) and charge and discharge are also stopped, the stop of charge and discharge is detected (step S24). The SOC of the lead battery at the time of the stop of charge and discharge is calculated based on the integral of the quantity of a current which has been discharged. The calculated SOC is called SOC1 (step S23).

For example, it is assumed that the quantity of electricity actually charged and discharged is ΔSOC. If refresh charge is performed so that the SOC becomes 100%, the resultant SOC is presumed to be 100%. The SOC1 at the time of completion of charge and discharge is calculated by:

$$SOC1 = 100 - \Delta SOC \tag{1}$$

When charge and discharge are ended, the OCV of the lead battery is measured. Based on the measured OCV, the SOC is calculated. The calculated SOC is called SOC2 (step S25).

After SOC2 is calculated based on the OCV, the difference (SOC3) between SOC1 and SOC2 is calculated (step S26). SOC3 is compared with a predetermined value K (step S27). When SOC3 is greater than or equal to the predetermined value K, the life of a lead battery is determined to be expired (step S28).

In a lead battery, even if refresh charge is performed in an attempt to obtain the SOC of 100%, the actual SOC does not reach 100% due to degradation with use, i.e., the SOC is eventually less than 100%. The SOC obtained by refresh charge is lowered with an increase in degradation of the lead battery. When the life of the lead battery is expired, even refresh charge causes the SOC to be about 60% at most.

At an initial state of a lead battery, which there is no degradation, refresh charge can cause the SOC to be about 100%. Referring to FIG. 10, when ΔSOC corresponding to the quantity of charged and discharged electricity is 20% after completion of charge and discharge, SOC1 is 80% in accordance with formula (1) after completion of charge. In this case, since the lead battery is effectively charged up to about 100%, SOC2 which is calculated based on the OCV after charge is also 80%. Thus, in the case of the initial state where the lead battery is not degraded, there is substantially no difference between SOC1, which is calculated based on the quantity of actually charged and discharged electricity, and SOC2 which is calculated based on the OCV when the charging rate is small.

In contrast, when the degradation of the lead battery has proceeded and the life of the lead battery has substantially expired, even if refresh charge is performed in an attempt to obtain the SOC of 100%, the actual SOC becomes about 60% at most. In such a situation, when the lead battery is charged and discharged so that ΔSOC corresponding to an decrease in SOC based on the quantity of actually charged and discharged electricity is 20%, SOC1 is 80% in accordance with formula (1), similar to the case of the initial state of the lead battery.

In contrast, the actual SOC of the lead battery after refresh charge is only about 60%. Therefore, SOC2 which is calculated based on the OCV after charge and discharge is 40% which is obtained by the SOC of 60% being reduced by 20% corresponding to the quantity of actually charged and discharged electricity.

As described above, for a lead battery whose life is expired, while SOC1 calculated based on the quantity of actually charged and discharged electricity is 80%, actual SOC2 calculated based on the OCV after charge and discharge is 40%. The difference SOC3 (=SOC1−SOC2) is 40%. Therefore, it can be determined that the life of the lead battery is expired.

A certain value of SOC3 is used to determine whether the life of a lead battery is expired. For example, such a value is set to about 35%. If SOC3 is greater than or equal to 35%, it is determined that the life of a lead battery is expired.

As described above, the SOC of a lead battery at the time of completion of charge and discharge is calculated based on the OCV. Alternatively, the SOC may be calculated based on a discharging voltage when a discharging current is a predetermined value or less, for example, when an engine is stopped (idle-stop state) and charge and discharge are stopped. The SOC and the discharging voltage when a discharging current is a predetermined value has a substantially proportional relationship, similar to the case of OCV and SOC.

Figure 12:
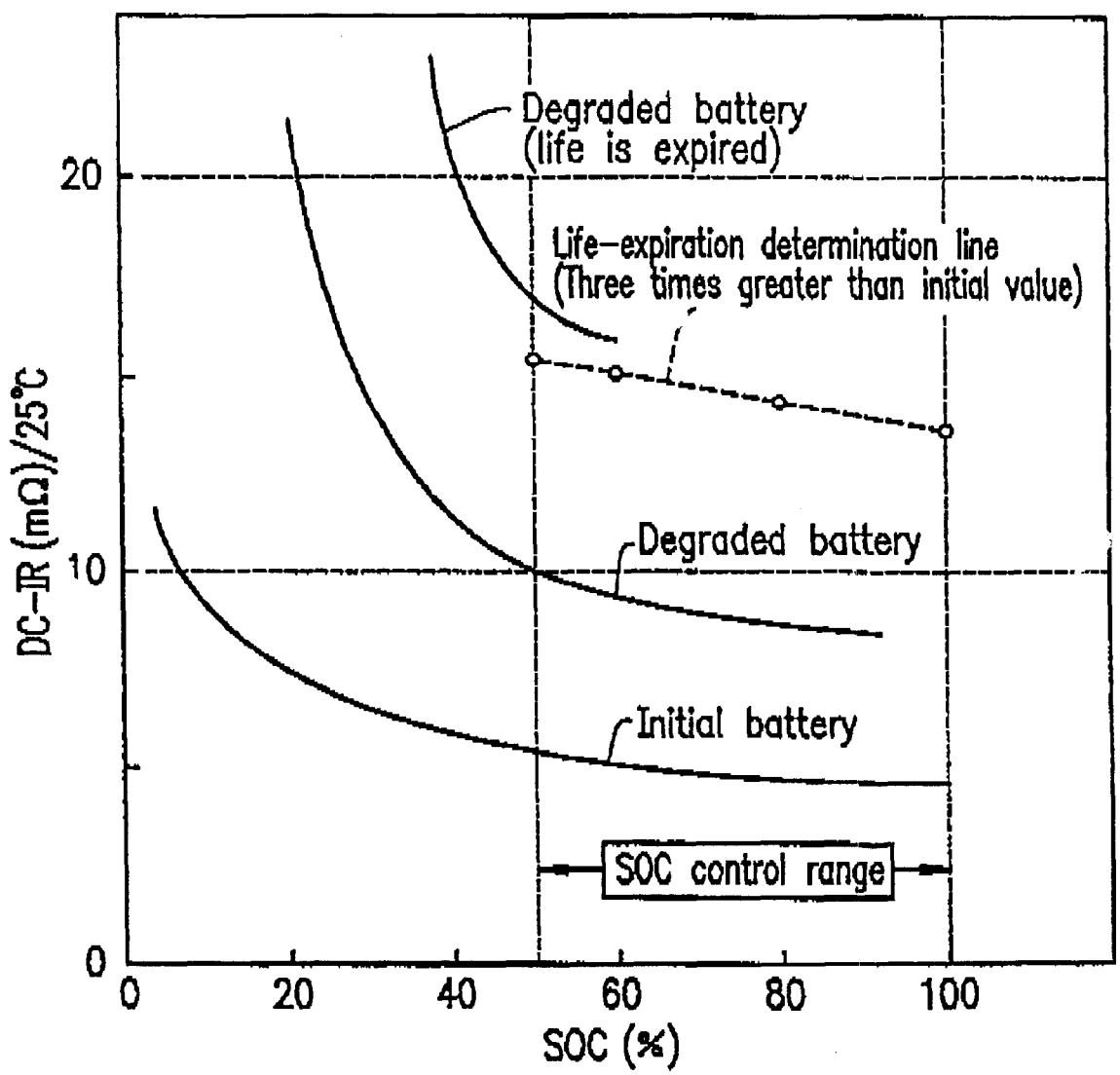
FIG. 12 is a graph showing a relationship between the DC-IR value of a lead battery and the SOC.

Further, as described above, in the life determination method of the present invention, the SOC calculated based on the OCV or a discharging voltage is used. Alternatively, the SOC may be calculated based on a DC-IR value, and based on the SOC, the life of the lead battery may be determined. The DC-IR value is a resistance value obtained based on a relationship between a discharging voltage and a discharging current FIG. 12 is a graph showing a relationship between the DC-IR value of a lead battery (12V, battery capacity is 30 Ah/5 HR), and the SOC. As is apparent from FIG. 12, in a control range (50% to 100%), the SOC is decreased substantially linearly with an increase in the DC-IR value. The SOC and the DC-IR value have a reverse-proportional relationship. In the initial state where the lead battery is not degraded, the DC-IR value is as small as about 5 mΩ (25° C.) in the SOC range of 50% to 100%. Thereafter, due to a reduction in the amount of an electrolyte solution, corrosion of a positive pole grid, a reduction in the sulfuric acid concentration of the electrolyte solution, or the like, the DC-IR value is increased. When the life of the lead battery is expired, the DC-IR value is increased up to about 15 mΩ.

Therefore, the DC-IR value, in the initial state where the lead battery is not degraded, is calculated in advance. When the DC-IR value becomes three times or more the initial DC-IR value, it is determined that the life of the lead battery is expired. The DC-IR value varies depending on temperature. Therefore, if temperature is corrected, it can be more accurately determined whether the life of the lead battery is expired.

Figure 13:
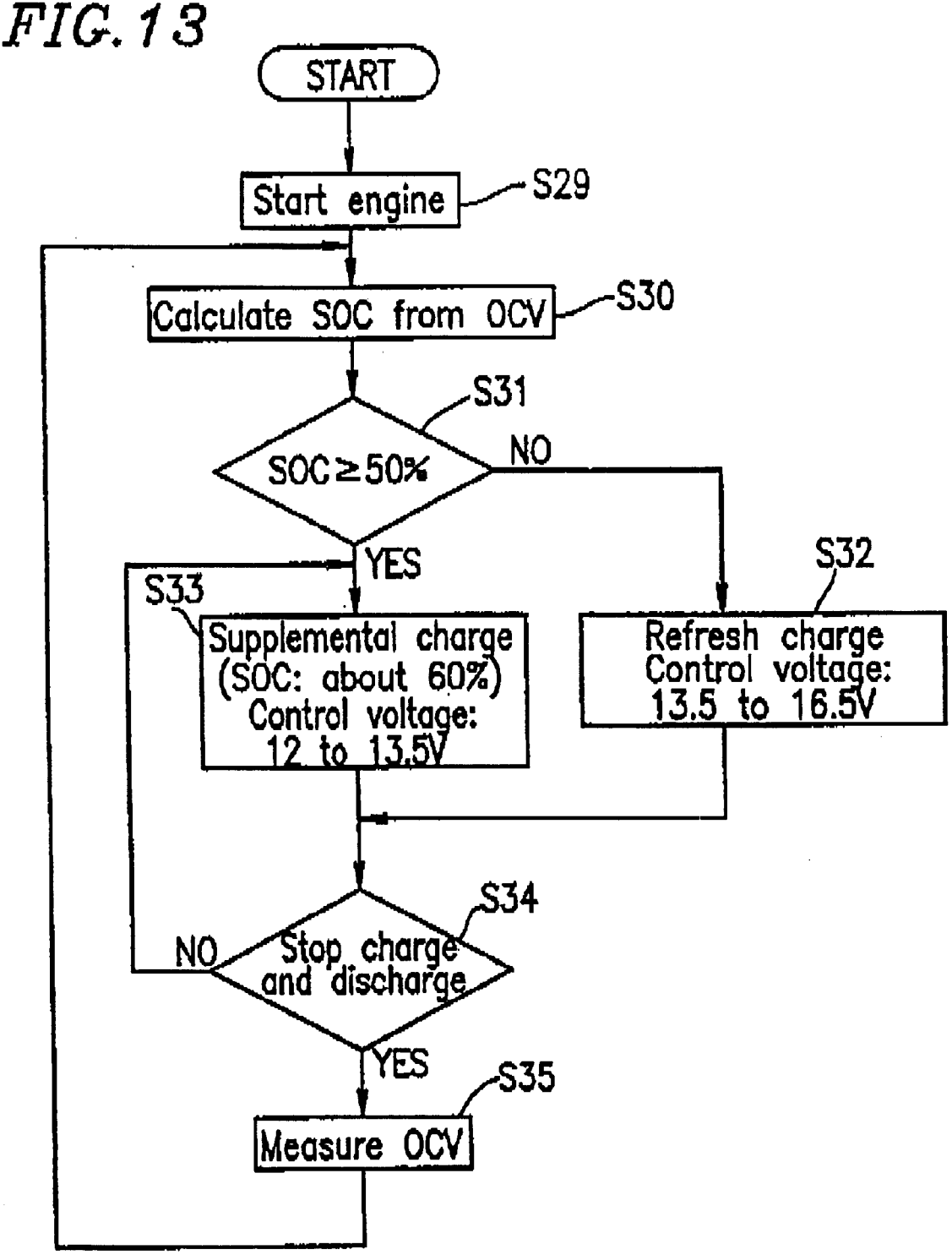
FIG. 13 is a flowchart showing an exemplary charging method using a method for detecting the SOC of a lead battery according to the present invention.

FIG. 13 is a flowchart showing an exemplary method for charging a lead battery according to the present invention in which the SOC of the lead battery is detected. In accordance with the method shown in the flowchart of FIG. 13, a lead battery carried on a vehicle is charged. In order to keep the lead battery capable of being regeneratively charged when driving, the lead battery is supplementarily charged after starting an engine (step S29 in FIG. 13) so that the SOC of the lead battery is about 60% (partial charge) (step S33). To obtain such a SOC, a 12-V lead battery is subjected to constant-voltage charge using a control voltage of 12 V to 13.5 V, for example.

During the supplemental charge, discharge is irregularly performed to provide power to an auxiliary machine for the engine, an air conditioner, or the like of a running vehicle. The states of such loads vary depending on the state of the running vehicle. The SOC of the lead battery varies over time. Therefore, the SOC needs to be detected, at least, at predetermined time intervals.

The SOC is calculated based on the OCV (step S30) which has been measured in step S35. If the SOC is 50% or more (step S31), the above-described supplemental charge is performed (step S33). However, if the SOC is less than 50% (step S31), refresh charge is performed (step S32).

Refresh charge is performed for the purpose of increasing the life of a lead battery when used in a partial charge state. For example, a 12-V lead battery is subjected to constant-voltage charge using a voltage of 13.5 V to 16.5 V which is higher than a voltage used in the supplemental charge in step S33.

The SOC is detected, when the lead battery is not charged and discharged in an idle-stop state or the like (step S34), by measuring the OCV (step S35).

Figure 14:
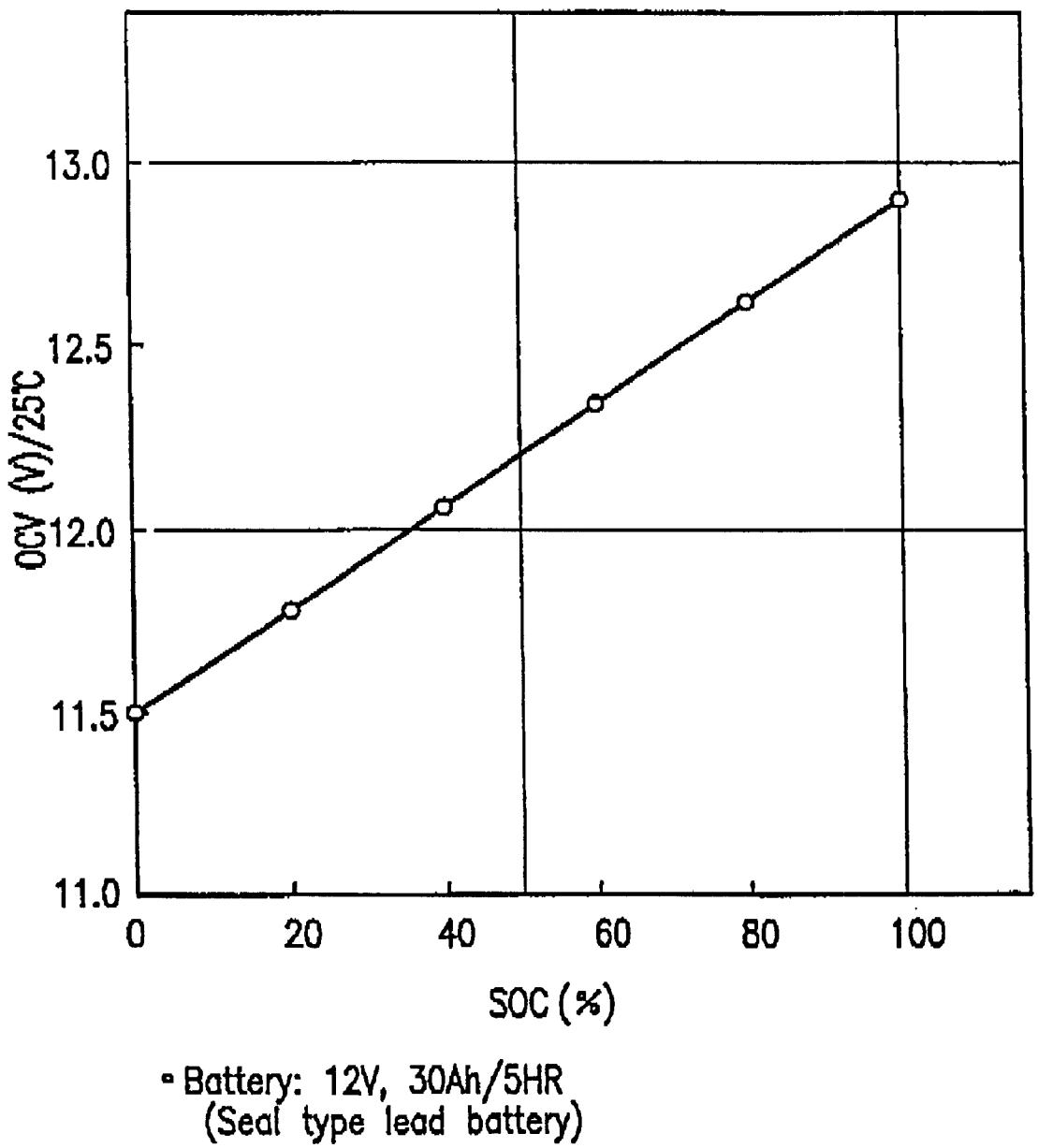
FIG. 14 is a graph showing SOC-OCV characteristics of a lead battery.

FIG. 14 is a graph showing an exemplary relationship between an OCV and a SOC. The SOC and the OCV have a substantially linear relationship. Therefore, the SOC can be calculated based on the OCV. The SOC is linearly increased with an increase in the OCV. A ratio of a variation in the OCV to a variation in the SOC, i.e., a gradient K, (FIG. 14) is a predetermined constant.

Figure 15:
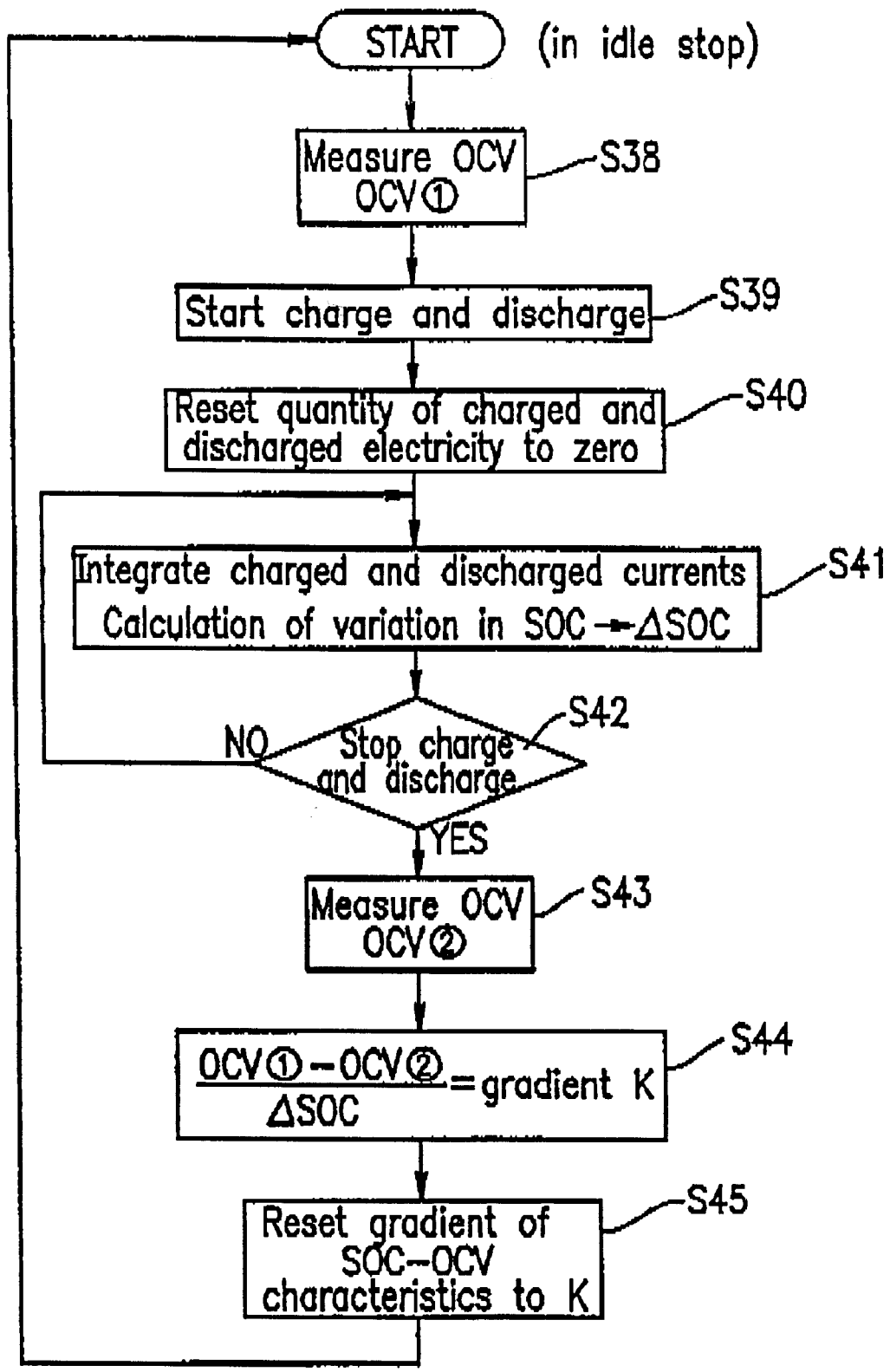
FIG. 15 is a flowchart showing an exemplary method for correcting the SOC in the SOC detecting method of the present invention.

When the SOC is calculated based on the OCV, the SOC is corrected. FIG. 15 is a flowchart showing an exemplary method for correcting the SOC.

For example, when a vehicle carrying a lead battery stops running and an engine is temporarily stopped (idle-stop state), the OCV of the lead battery is measured where the lead battery is not charged and discharged (step S38 in FIG. 15). The measured OCV is called OCV1.

After OCV1 has been measured, the lead battery begins to be charged and discharged (step S39). This charge and discharge corresponds to the supplemental charge in step S33 of FIG. 13.

In this case, a current sensor for detecting the quantity of charging and discharging currents is reset (step S40). The quantity of charged and discharged electricity is newly integrated. This quantity of charged and discharged electricity is divided by the initial capacity of the lead battery to calculate a variation in the SOC, i.e., ΔSOC (step S41).

Thereafter, the OCV of the lead battery at the time of the end of charge and discharge is measured (step S43). The measured OCV is called OCV2.

After OCV2 has been measured, the difference between OCV1 measured before the start of charge and discharge and OCV2 measured at the time of the end of charge and discharge is calculated (step S44). The ratio of a variation in the OCV to a variation in the SOC (A SOC) is obtained by dividing the variation in the OCV by the variation in the SOC (step S44). The ratio is represented by gradient K.

As shown in FIG. 14, the OCV and SOC of the lead battery have a linear relationship. The gradient K and Y intercept (the OCV value corresponding to the SOC of 0%) of the relationship are initially set to predetermined values. When the gradient K is calculated in step S44, the calculated gradient K is newly set (step S45). Thereafter, the SOC is calculated based on the relationship represented by the newly set K.

Figure 16:
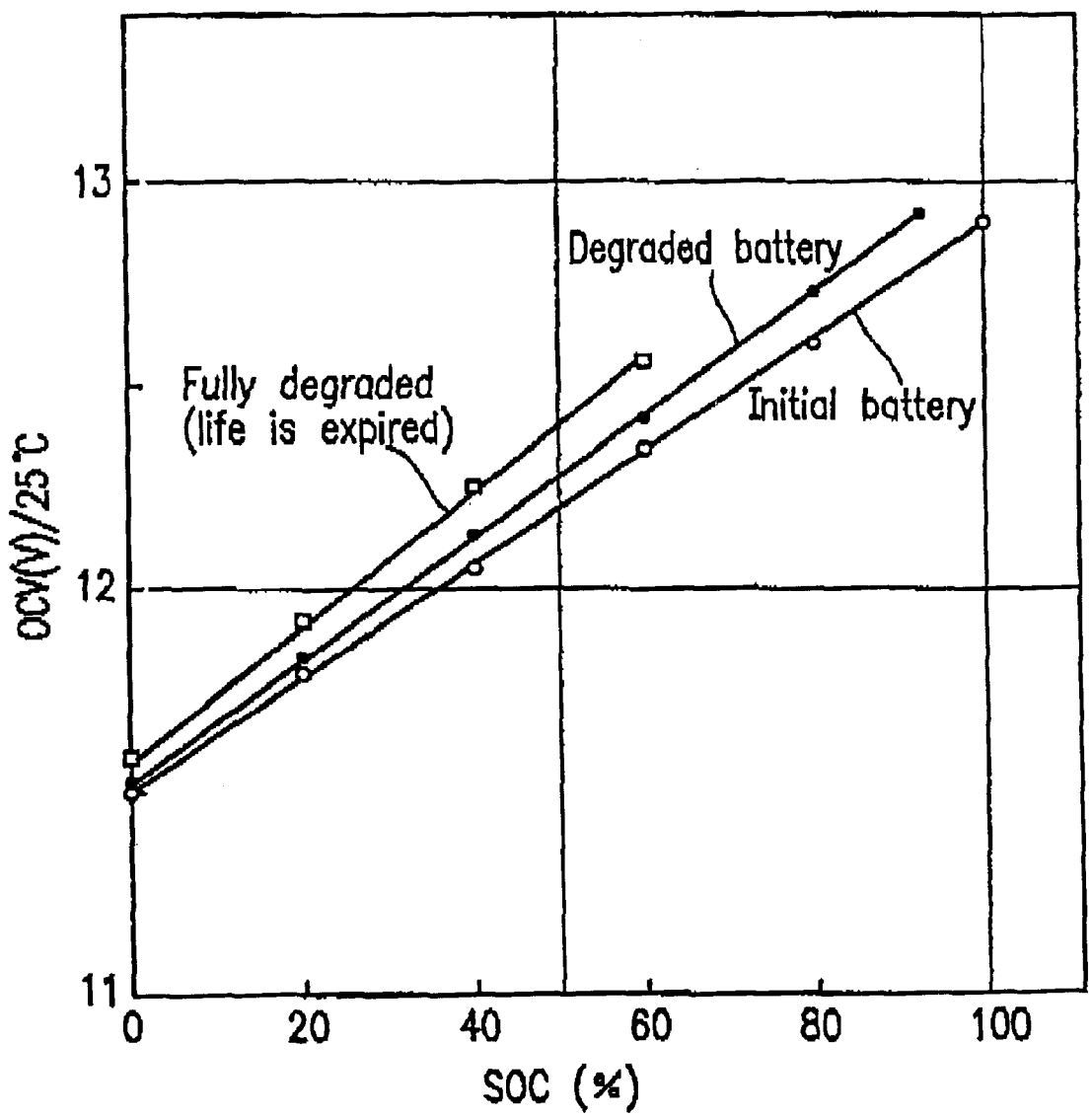
FIG. 16 is a graph showing variations in the SOC-OCV characteristics of a lead battery due to degradation over time.

FIG. 16 is a graph showing variations in the relationship between the OCV and the SOC due to degradation of a lead battery. For an initial relationship between the OCV and the SOC of the lead battery, the gradient K is small. The gradient K (K1 in FIG. 16) of a 12-V lead battery is about 0.014. In contrast, when the lead battery is degraded due to use, the gradient K (K2 in FIG. 16) representing the relationship between the OCV and the SOC is increased to about 0.016. When the life of the lead battery is expired, the gradient K (K3 in FIG. 16) is as much as about 0.018.

As described above, the gradient K representing the relationship between the OCV and the SOC of the lead battery is changed due to degradation with use of the lead battery. In accordance with the method for detecting the SOC of the present invention, the gradient K is appropriately calculated and updated, so that the SOC is accurately obtained from the OCV. When such a SOC detecting method is applied to the charging and discharging method of FIG. 13, the SOC can be controlled in such a manner that the SOC falls within an appropriate range.

Further, based on the above-described gradient K, the degree of degradation of the lead battery can be determined. In the above-described example, the gradient K3 is 0.018 at the time when the life of the 12-V lead battery is expired. Therefore, if a means is provided to notice a user of the lead battery that the lead battery is close to the life expiration before the gradient K reaches 0.018, e.g., at the time when the gradient K reaches 0.017, the user can know that fact, and replace the lead battery.

Alternatively, instead of the OCV, the SOC may be calculated based on a discharging voltage when a driving current is less than or equal to a predetermined driving current. In this case, the SOC is calculated based on the discharging voltage of the lead battery at a predetermined time after the start of discharge in accordance with a relationship between the SOC and the discharging voltages corresponding to predetermined discharging currents. A corrected gradient K is calculated by dividing a variation in the discharging voltage by a variation in the SOC (ΔSOC). Therefore, in a manner similar to that described above, a corrected SOC is accurately obtained.

To obtain an accurate SOC, the SOC is preferably calculated based on a discharging voltage when a discharging current is less than or equal to 2 CA with respect to a battery capacity. This is because if the discharging current exceeds 2 CA, the gradient K is not constant, particularly when the SOC is less than 40%, so that the linear relationship between the discharging voltage and the SOC is impaired.

According to the battery charging method of the present invention, when degradation of a lead battery is predicted, refresh charge is performed so that the SOC becomes about 90% or more. Therefore, the degradation of the lead battery is prevented, thereby making it possible to use the lead battery stably for a long time.

Further, based on the SOC or the DC-IR value after charge, whether the life of the lead battery is expired is accurately determined. Therefore, it is possible to avoid the situation where the lead battery is unexpectedly inoperable.

Furthermore, it is possible to appropriately correct the relationship between an OCV and an SOC or the relationship between a discharging voltage and an SOC which is varied due to degradation with use of the lead battery. Therefore, an accurate SOC can be obtained without an influence due to a progression of degradation of the lead battery. Therefore, the battery charging method of the present invention is preferable for the control of SOC. Moreover, a gradient K representing the degradation state of the lead battery is calculated. The degradation state of the lead battery can be determined based on the gradient K.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for charging a lead battery, wherein:
   a state of charge is controlled so as to be less than 100%; and
   when the lead battery has not been charged and discharged for a predetermined time, refresh charge is performed so that the state of charge becomes at least 90% or more.

2. A method for charging a lead battery, wherein:
   a state of charges is controlled so as to be less than 100%; and
   every time the lead battery is charged and discharged in predetermined time intervals, refresh charge is performed so that the state of charge becomes at least 90% or more.

3. A method for charging a lead battery, wherein:
   a state of charge is controlled so as to be less than 100%; and
   when the state of charge is lowered below a predetermined value, refresh charge is performed so that the state of charge becomes at least 90% or more.

4. A method for charging a lead battery, wherein:
   a state of charge is controlled so as to be less than 100%; and
   when a temperature of the lead battery is less than or equal to a predetermined value, refresh charge is preformed so that the state of charge becomes at least 90% or more.

5. A method according to claim 1, wherein:
   in the refresh charge, after a charging current is lowered to a predetermined value even though the lead battery is subjected in constant-voltage charge using a predetermined control voltage, constant-current charge is performed, or constant-voltage charge is performed using a control voltage higher than the predetermined control voltage.

6. A method according to claim 2, wherein a set value of the state of charge, after the refresh charge, is increased with an increase in a cycle of the refresh charge.

7. A method according to claim 1, wherein the state of charge is calculated based on an open circuit voltage of the lead battery immediately before the start of charge and discharge of the lead battery.

8. A method according to claim 1, wherein the state of charge is calculated based on an open circuit voltage of the lead battery when charge and discharge are paused, or based on a discharging current and a discharging voltage.

9. A method for determining the life of a battery, wherein:
the battery is subjected to refresh charge, a state of charge of the battery after the refresh charge is presumed to be 100%, charge and discharge are performed, and a state of charge (1) of the battery after the charge and discharge, the state of charge (1) obtained base on quantity of the charge, and a state of charge (2) obtained based an open circuit voltage are compared with each other, and the life of the battery is determined based on a difference between the state of charge (1) and the state of charge (2).

10. A method for determining the life of a battery, wherein a first DC-IR value is obtained with respect to a state of charge of the battery in an initial state where the battery is not degraded, based on charging and discharging currents and an open circuit voltage, and the first DC-IR value is compared with a second DC-IR value of the battery in the initial state obtained in advance, and the life of the battery is determined based on a difference between the first and second DC-IR values.

11. A method for detecting a state of charge or a lead battery, wherein an open circuit voltage of the lead battery or a discharging voltage of the lead battery when a discharging current is less than or equal to a predetermined value is measured, and the state of charge of the lead battery is detected based on a relationship between the predetermined open circuit voltage and the state of charge or a relationship between the discharging voltage and the state of charge, and when the state of charge is calculated, a variation in the open circuit voltage or a variation in the discharging voltage and a variation in the state of charge are measured with respect to a predetermined time, and the relationship between the predetermined open circuit voltage and the state of charge or the relationship between the discharging voltage and the state of charge is corrected.

12. A method according to claim 11, wherein the variation in the state of charge is obtained based on a quantity of charged and discharged electricity obtained by integrating charging and discharging currents in the predetermined time.

13. A method for determining degradation of a lead battery using a method for detecting a state of charge of a lead battery according to claim 11 or 12, wherein the degradation of the lead battery is determined based on a corrected relationship between an open circuit voltage of the lead battery and the state of charge or a corrected relationship between a discharging voltage and the state of charge.

14. A method according to claim 13, wherein a ratio of a variation on the open circuit voltage or a variation in the discharging voltage to a variation in the state of charge is calculated, and the degradation of the lead battery is determined based on the ratio.

15. A method according to claim 14, wherein a value (K) is calculated by dividing the variation in the open circuit voltage or the variation in the discharging voltage by the variation in the state of discharge, and when the value (K) is greater than or equal to a predetermined value, it is determined that the lead battery is degraded.

* * * * *